United States Patent [19]

Morton et al.

[11] Patent Number: 5,771,258

[45] Date of Patent: Jun. 23, 1998

[54] AERODYNAMIC CHAMBER DESIGN FOR HIGH PULSE REPETITION RATE EXCIMER LASERS

[75] Inventors: Richard George Morton; Igor Vladimirovich Fomenkov; William Norman Partlo, all of San Diego, Calif.

[73] Assignee: Cymer, Inc., San Diego, Calif.

[21] Appl. No.: 857,608

[22] Filed: May 16, 1997

Application Data

[60] Provisional application No. 60/037,895 Feb. 11, 1997.

[51] Int. Cl.⁶ .......................................................... H01S 3/22
[52] U.S. Cl. ................................. 372/57; 372/58; 372/86
[58] Field of Search ................................. 372/57, 55, 86, 372/87, 58

[56] References Cited

U.S. PATENT DOCUMENTS

| | | | |
|---|---|---|---|
| 4,005,374 | 1/1977 | Levatter et al. . | |
| 4,611,327 | 9/1986 | Clark et al. | 372/57 |
| 4,637,031 | 1/1987 | Gürs et al. . | |
| 4,771,436 | 9/1988 | Koseki . | |
| 4,891,818 | 1/1990 | Levatter . | |
| 4,959,840 | 9/1990 | Akins et al. | 372/57 |
| 5,023,884 | 6/1991 | Akins et al. | 372/57 |
| 5,029,177 | 7/1991 | Akins et al. | 372/57 |
| 5,033,056 | 7/1991 | Perzl . | |
| 5,033,059 | 7/1991 | Perzl et al. . | |
| 5,337,330 | 8/1994 | Larson | 372/86 |
| 5,377,215 | 12/1994 | Das et al. | 372/57 |

*Primary Examiner*—Leon Scott, Jr.
*Attorney, Agent, or Firm*—David G. Beck

[57] ABSTRACT

An excimer laser chamber capable of arc-free operation at repetitive pulse rates of 1 kHz or greater is provided. The chamber balances the electrode design criteria required to produce a well-defined discharge channel with the flow design criteria required to achieve high clearing rates at comparatively high blower efficiency. A ceramic insulator located on either side of the cathode/pre-ionizer assembly enhances the flow of gas through the discharge region by reducing the turbulence in the electrode region. A series of specifically designed flow vanes further enhance the gas flow. The gas exiting the blower fan is guided into the discharge region with one vane. The anode support bar is extended downwardly, thus improving the efficiency of the tangential blower and also minimizing the amount of gas bypassing the discharge region. A pair of vanes downstream from the discharge region smoothly direct the heated gas towards the heat exchanger. These vanes reduce the collapse of the flow velocity as it leaves the electrode region, thus minimizing turbulence.

14 Claims, 7 Drawing Sheets

AERODYNAMIC CHAMBER DESIGN FOR HIGH PULSE REPETITION RATE EXCIMER LASERS

This patent application is related to a U.S. Provisional patent application entitled "AERODYNAMIC CHAMBER DESIGN FOR HIGH PULSE REPETITION RATE EXCIMER LASERS", U.S. Provisional Application No. 60/037,895, which was filed on Feb. 11, 1997 by Richard G. Morton, et al., the disclosure of which we claim priority and is incorporated by reference.

The present invention relates generally to lasers and, more particularly, to an excimer laser capable of achieving pulse repetition rates of 1 kilohertz (kHz).

BACKGROUND OF THE INVENTION

As the desired feature sizes on integrated circuits have grown smaller, the demands on optical lithography techniques have grown greater. These demands have led to the development of near diffraction limited optical projection systems as well as the exploration of a variety of illumination sources. Given equivalent optical systems, illumination sources operating at shorter wavelengths are more desirable than those operating at longer wavelengths due to their ability to form smaller features. Gas discharge lasers, particularly excimer lasers, are uniquely suited for such applications due to the combination of short discharge wavelength with high power. For example, the wavelength of a krypton fluoride (KrF) excimer laser is approximately 248.4 nanometers.

Excimer lasers generally operate in a pulsed mode. Pulsing is required to provide the gas within the discharge region sufficient time to return to its initial thermal state. In a static gas system, the gas may take times on the order of a second to reach this state, thus severely limiting the repetition rate. Modern laser systems achieve higher repetition rates by actively circulating the gas within the gas discharge region, typically using a tangential blower fan to circulate the gas.

U.S. Pat. No. 4,611,327, entitled "Gas Transport Laser System," describes a high average power, high repetition rate pulsed gas laser. The disclosed system utilizes two tangential blowers to transport the gas at a high speed past an eccentrically mounted electrode assembly. The system achieved a pulse rate of 500 Hz and an average output power of 100 watts (W).

U.S. Pat. No. 5,033,056, entitled "Gas Laser," describes a gas laser with a closed gas flow channel. The gas flows through the discharge chamber and past the electrode assembly at high speed. The laser uses a cross current blower and a well defined channel to achieve the desired flow rates. Turbulence is reduced and an appropriate pressure differential is obtained using a pair of baffle bodies.

U.S. Pat. No. 4,637,031, entitled "Apparatus for the Generation of Laser Radiation," describes a high pulse frequency transversely excited atmospheric pressure laser. A rectangular or square cross-section laser chamber is used. The laser gas which is circulated with one or more fans passes through a cooler prior to entering the discharge chamber.

U.S. Pat. No. 4,771,436, entitled "Gas Laser Oscillator Having a Gas Flow Smoothing Device to Smooth Gas Flow in the Electrical Discharge Region," describes a high speed, axial flow gas laser oscillator. In order to achieve very high flow rates while maintaining a stable electrical discharge, a gas flow smoothing device is installed in the gas inlet of the electrical discharge region. The preferred embodiment uses a cylindrical mesh to achieve the smoothing function.

From the foregoing, it is apparent that an excimer laser chamber with increased gas flows is desired in order to achieve high pulse repetition rates.

SUMMARY OF THE INVENTION

The present invention provides an excimer laser chamber capable of arc-free operation at repetitive pulse rates of 1 kHz or greater. The chamber balances the electrode design criteria required to produce a well-defined discharge channel with the flow design criteria required to achieve high clearing rates. The clearing rate is the rate at which the gas within the discharge region can be replaced with fresh gas, thus providing a laser medium which is free of optical and electrical inhomogeneities.

The invention utilizes a ceramic insulator located on either side of the cathode/pre-ionizer assembly. The ceramic insulator enhances the flow of gas through the discharge region by reducing the turbulence in the electrode region. A ceramic material is used in order to prevent arcing from the high voltage electrode to the grounded chamber housing.

A series of specifically designed flow vanes are preferably included in the laser chamber of the present invention. The gas exiting the blower fan is guided into the discharge region with one vane. The anode support bar is extended downwardly, thus improving the efficiency of the tangential blower and also minimizing the amount of gas bypassing the discharge region. A pair of vanes is used to smoothly direct the gas out of the discharge region and towards the heat exchanger. The ceramic insulators in conjunction with a pair of vanes reduces the collapse of the flow velocity as it leaves the electrode region, thus minimizing turbulence.

A further understanding of the nature and advantages of the present invention may be realized by reference to the remaining portions of the specification and the drawings.

DESCRIPTION OF THE PREFERRED EMBODIMENT

One of the principal limitations to achieving high pulse repetition rates is the speed with which gas in the discharge region may be replaced. Between each individual pulse, the gas in the discharge region must be completely replaced so that the laser medium will be free of optical and electrical inhomogeneities. This is required in order to generate pulses with a high degree of repeatability, both in energy content and spatial intensity profile.

Replacement of the gas within the discharge region during the interpulse time generally places higher demands on the blower fan assembly as the pulse rate increases. Increased fan speeds result in higher mechanical stresses on the fan, motor, bearings, and other drive train hardware.

Besides placing high gas throughput requirements on the blower fan, the entire chamber must be designed to achieve the required flow rates while minimizing turbulence and stagnation areas near the discharge region. In addition, the cathode and anode typically have electrode design constraints placed on them in order to properly concentrate the electric field along the axis of the laser optical cavity.

Another constraint placed on the design of a high pulse repetition rate excimer laser is the need to prevent gross arc-overs from the high voltage electrode to the metal chamber housing which is at ground potential. Typically the voltages which are used in an excimer laser are in the range of 10 to 20 kilovolts (kV). At these voltage levels surface tracking along insulating materials is also a potential problem. Arc-overs which occur outside of the intended discharge region reduce the energy available for pumping the laser medium, thereby reducing the UV pulse energy. Arc-overs also cause erosion of chamber components other than the electrodes, thus limiting system lifetime. Furthermore, arcovers lead to unstable pulse energy making dose control difficult if not impossible.

At very high pulse rates such as those in the 1 kHz range it becomes important to replace the gas in the entire electrode region, not just the region comprising the laser mode volume. This is because the lifetime of the ions produced during the discharge is sufficiently long to cause downstream arcing during the next discharge if the gas is not swept entirely out of the regions containing a high electric field. Simply having fresh gas in the laser region for successive pulses is insufficient to guarantee consistent pulse energy and beam properties.

Figure 1:
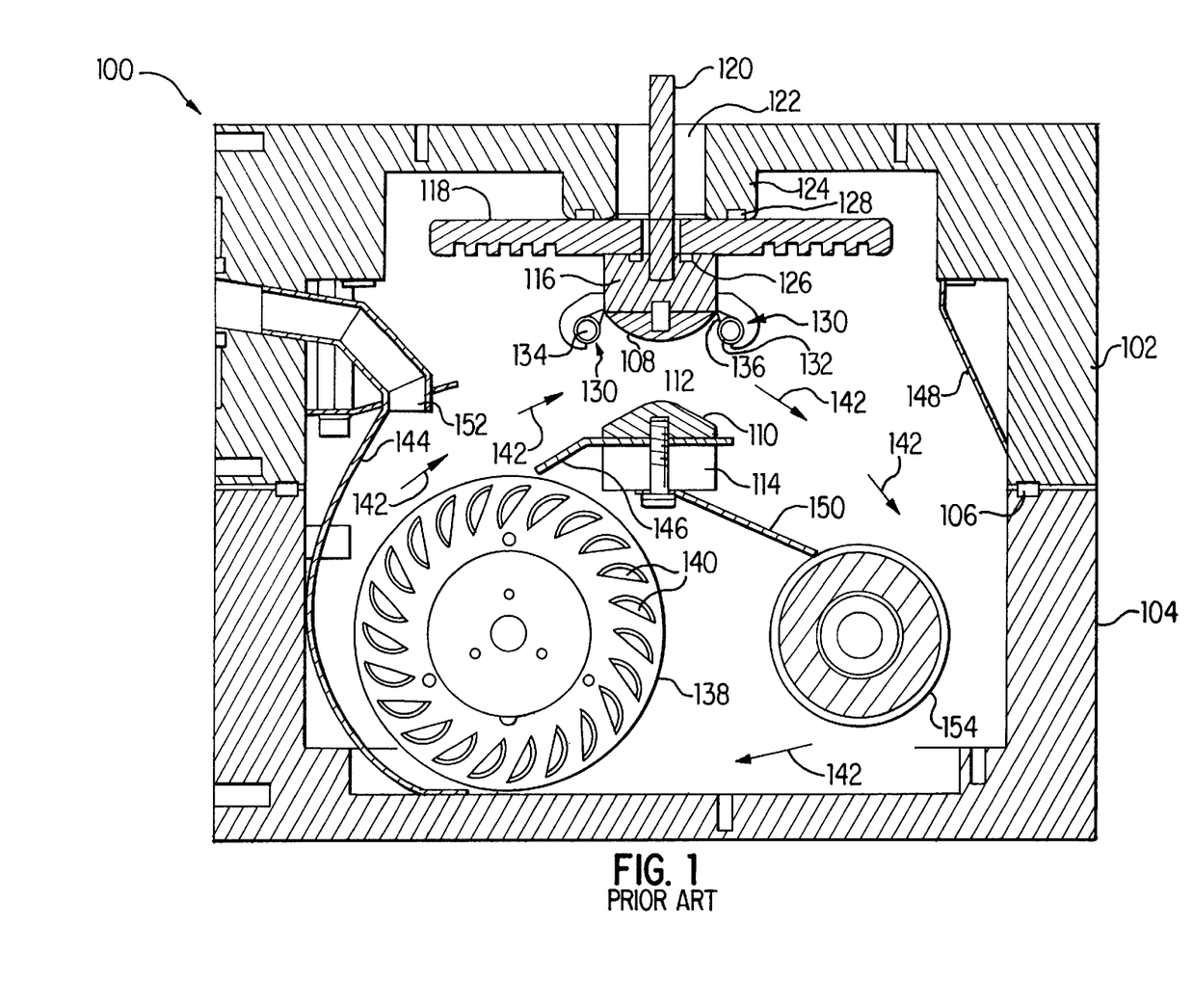
FIG. 1 is a schematic end illustration of an excimer laser including a pre-ionizer according to the prior art.

FIG. 1 is a cross-sectional view of a laser 100 according to the prior art. The general construction of this laser may correspond to that disclosed in U.S. Pat. Nos. 4,959,840 (entitled "Compact Excimer Laser Including an Electrode Mounted in Insulating Relationship to Wall of the Laser"), 5,033,055 (entitled "Compact Excimer Laser"), 5,377,215 (entitled "Excimer Laser"), and 5,377,330 (entitled "Pre-Ionizer for a Laser"), all of which are commonly assigned to the assignee of this application and are incorporated by reference for any and all purposes.

The laser 100 includes a housing formed from a pair of half members 102 and 104. The half members 102 and 104 are coupled and sealed, for example by an O-ring 106 which extends around the perimeter of the housing.

A cathode 108 and a grounded anode 110 are disposed in a spaced relationship within the housing. Cathode 108 and anode 110 may be formed from suitable high purity metals so as to minimize the erosion of the metals and to avoid contaminating the laser gases with erosion products which may be formed. An electrical discharge area 112 is disposed between cathode 108 and anode 110. The electrical discharge in area 112 is produced by a high voltage pulse such as in the order of 20 kV impressed on cathode 108.

A base member 114 made from a suitable conducting material supports anode 110. Anode 110 and member 114 are electrically coupled to housing 102 with a ground return cage (not shown). The ground return cage has numerous cut-outs, thereby having minimal impact on the circulation of gas through laser 100.

A conductive member 116 contacts cathode 108 and is disposed adjacent a main insulator plate 118. Main insulator plate 118 separates and insulates threaded metal rods 120 from one another. Threaded metal rods 120 engage conductive member 116 to introduce the high voltage to cathode 108. Threaded rods 120 extend through insulating bushings 122 made from a suitable material such as a ceramic.

Upper housing member 102 includes downwardly extending wall portions 124 so that main insulator plate 118 is spaced from the upper wall of housing member 102. O-rings 126 are disposed in recesses in conductive member 116 on one side of main insulator plate 118 and O-rings 128 are disposed in recesses on the other side of main insulator plate 118 so that the central portion of plate 118 is held in compression between the O-rings. Main insulator plate 118 electrically insulates cathode 108 from the walls of the housing structure and thereby insures that a proper electrical discharge occurs between cathode 108 and anode 110.

When a voltage pulse is applied to cathode 108 through connector rods 120 and conductive member 116, an electrical discharge is produced in region 112. This electrical discharge ionizes gases in the vicinity of region 112 and causes a chemical reaction to be produced between the gases. For example, Kr and $F_2$ react chemically to produce KrF. When this chemical reaction occurs, energy as in the form of light is produced at a particular wavelength. The coherent energy is produced with high intensity and in a narrow beam. It is directed from the cavity through a window (not shown).

Pre-ionizers generally indicated at 130 may be disposed within the cavity to facilitate the ionization of gases by introducing ultraviolet light. The ultraviolet light is produced by a corona discharge to the gases just before the gas in the main discharge region becomes electrically conducting between anode 110 and cathode 108.

Pre-ionizers 130 may be disposed between electrodes 108 and 110 and may be separated from each other in a second direction transverse, preferably perpendicular, to the first direction. Pre-ionizers 130 extend in the cavity in a third direction transverse, preferably perpendicular, to the first and second directions. Electrodes 108 and 110 also extend in the cavity in the third direction. This third direction may be considered to be into the plane of the paper in FIG. 1.

Each pre-ionizer 130 includes a hollow tube 132 made from a suitable material providing a high dielectric constant and a high dielectric strength. Preferably tubes 132 are made from a ceramic material such as a polycrystalline translucent aluminum oxide. The material preferably prevents any corona discharge on the external surfaces of tubes 132 from entering into the tubes.

An electrical conductor 134 is disposed within each tube 132. Preferably conductor 134 is electrically coupled to the laser housing which is held at ground. An electrical conductor 136 is disposed on the surface of tube 132, running approximately the full length of electrode 108. Conductors 136 may be in the form of resilient springs constrained to be disposed against the surfaces of associated tubes 132 with a moderate force. Conductors 136 are held at the potential of cathode 108.

The recirculation of the gases within the laser is provided by a fan 138 having a plurality of blades 140. Fan 138 drives the gases along a path 142 through discharge region 112. To facilitate the gas flow, the system includes vanes 144, 146, 148, and 150. A gas scoop 152 of approximately circular cross-section siphons a portion of the gases out of the housing for filtering, thereby removing debris and various contaminants from the gases.

Most of the electrical energy deposited in the gas by the electrical discharge between cathode 108 and anode 110 is converted to heat. This heat is removed by forced convective exchange with a radial finned, water cooled heat exchanger 154. Mechanical work done on the gas by fan 138 is also ultimately converted to heat which is removed by heat exchanger 154.

Figure 2:
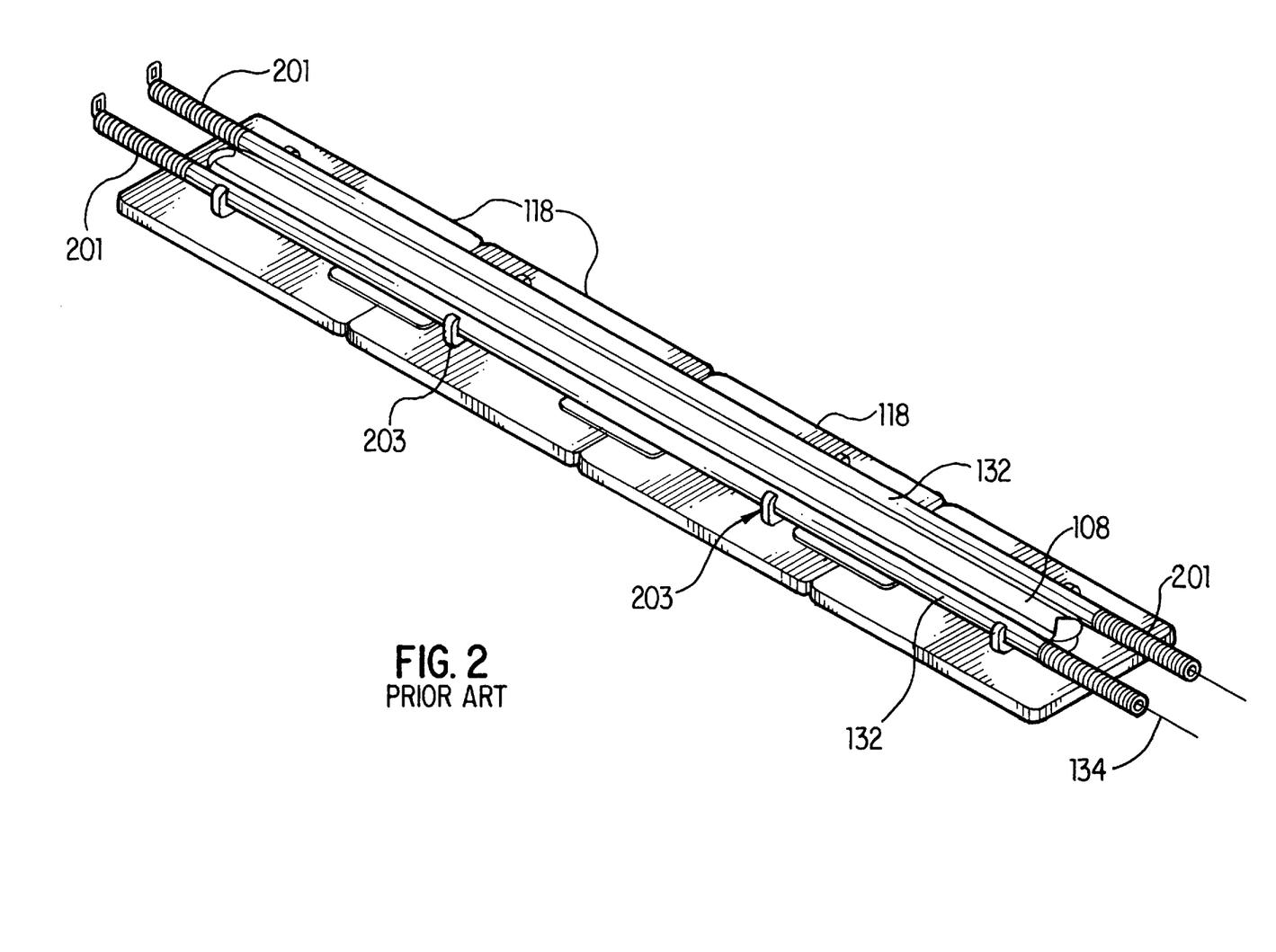
FIG. 2 is a perspective view of the cathode and preionizer assembly of the excimer laser illustrated in FIG. 1.

FIG. 2 is a perspective view of the cathode and preionizer assembly of the excimer laser illustrated in FIG. 1. In this view cathode 108 and pre-ionizer tubes 132 are clearly visible. As shown, main insulator plate 118 is comprised of four separate plates. Plate 118 may also be fabricated from a single piece of insulating material, for example a single sheet of aluminum oxide.

Disposed on either end of tubes 132 are bushings 201. Bushings 201 prevent electrical discharge or arcing along tubes 132 from conductors 136 to the laser housing. Preferably the material of bushings 201 is homogeneous with the material of tubes 132. Even more preferably, the material of bushings 201 is identical to the material of tubes 132. Tubes 132 and bushings 201 may be fabricated from a single piece of material, thus achieving the same high dielectric properties and eliminating the need for any adhesive between tubes 132 and bushings 201.

Tubes 132 are held in place and against conductors 136 by several positioning members 203. Preferably positioning members 203 are fabricated from an insulating material. Members 203 may also be of a conducting material, however this configuration may lead to downstream arcing. Conductive positioning members may also interfere with the formation of a corona discharge in the area immediately surrounding the members.

Electrical conductors 134 and 136 define first and second plates of a capacitor. Tubes 132 serve as the dielectric material between the plates of the capacitors. Preferably a high voltage is applied to electrical conductors 136, such as the cathode potential, and electrical conductors 134 are grounded. The dielectric material of tubes 132 has properties to support a capacitive corona discharge without dielectric breakdown.

When a voltage pulse is applied between electrical conductors 134 and 136, the electrical charges cause corona discharges to be produced from the surfaces of tubes 132. These corona discharges emit radiation which travel to region 112. The radiations pre-ionize the gases within region 112 so that the ionization of the gases is facilitated when a voltage pulse is produced between cathode 108 and anode 110.

Figure 3:
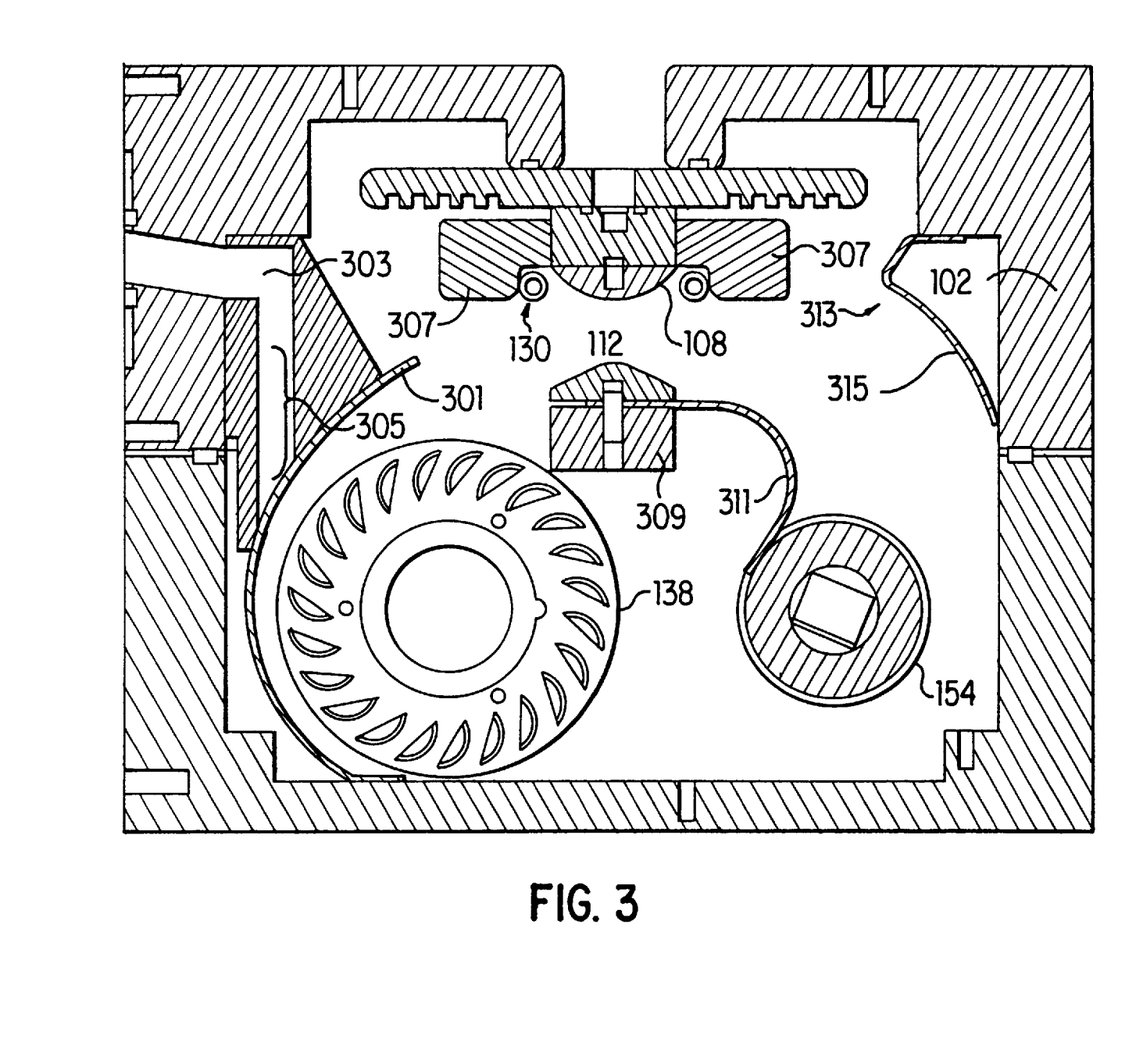
FIG. 3 is a schematic end illustration of an excimer laser according to the invention.

FIG. 3 is a schematic end illustration of an excimer laser according to the invention. This laser is substantially equivalent to the laser illustrated in FIG. 1 except for the addition and/or modification of numerous gas flow vanes and related structures. Due to these alterations it is possible to achieve the necessary flow velocity to completely clear electrode region 112 between laser pulses even at a rate of 1 kHz or greater. This system also minimizes the electrical power demand of blower 138. All of the materials used in the construction of these modifications are fluorine compatible and do not distort the electric field in discharge region 112.

Vane 301 is designed to smoothly direct the gas from blower fan 138 towards discharge region 112. The end of vane 301 also extends further towards discharge region 112 than the prior art vane, thus preventing stagnation of the gas prior to reaching discharge region 112. In this embodiment as in the prior art, a gas scoop 303 siphons a portion of the gases away for filtering. However, scoop 303 includes an extension 305 which allows the gases to be siphoned off at a distance from region 112. This allows vane 301 to recondition the flow prior to entering the electrode discharge region.

On either side of anode 108 and pre-ionizers 130 is a ceramic insulator 307. Insulators 307 reduce the turbulence within discharge region 112. Insulators 307 are preferably fabricated from a ceramic such as aluminum oxide thus providing flow guidance without promoting arcing from the high voltage electrode to the grounded housing.

In the prior art, cut-off vane 146 was included to prevent the gas from by-passing discharge region 112. Preferably this vane is removed and support 309 for anode 110 is extended downwardly, thus improving the efficiency of the tangential blower and also minimizing the amount of gas by-passing the discharge region.

In the prior art, exit vane 150 was used to insure that the heated gas exiting the discharge region passed heat exchanger 154. However, because vane 150 was mounted near the bottom of support 114 the gas exiting the discharge region went from a small cross-sectional area to a very large cross-sectional area. This configuration resulted in the gas flow collapsing as it passed outside of the discharge region, leading to a very turbulent region which prevented the smooth passing of the gas through discharge region 112. In the preferred embodiment of the invention, vane 150 is replaced with an exit vane 311 which is mounted between anode 110 and support 309. Vane 311, in conjunction with insulator 307, provides a gradual change in flow cross-section. This graduated change reduces the collapse of flow velocity, thus minimizing turbulence in the region outside of discharge region 112. Furthermore, the smooth arc of vane 311 aids in directing the heated gas towards heat exchanger 154.

Vane 148 is preferably replaced with an exit vane 313. Vane 313 extends further from housing 102 than prior art vane 148, thus helping to prevent the collapse of the flow velocity as the gas leaves discharge region 112. Vane 313 also includes a curved surface 315 which, in conjunction with vane 311, smoothly redirects the flow of heated gas leaving the discharge region towards heat exchanger 154.

Figure 4:
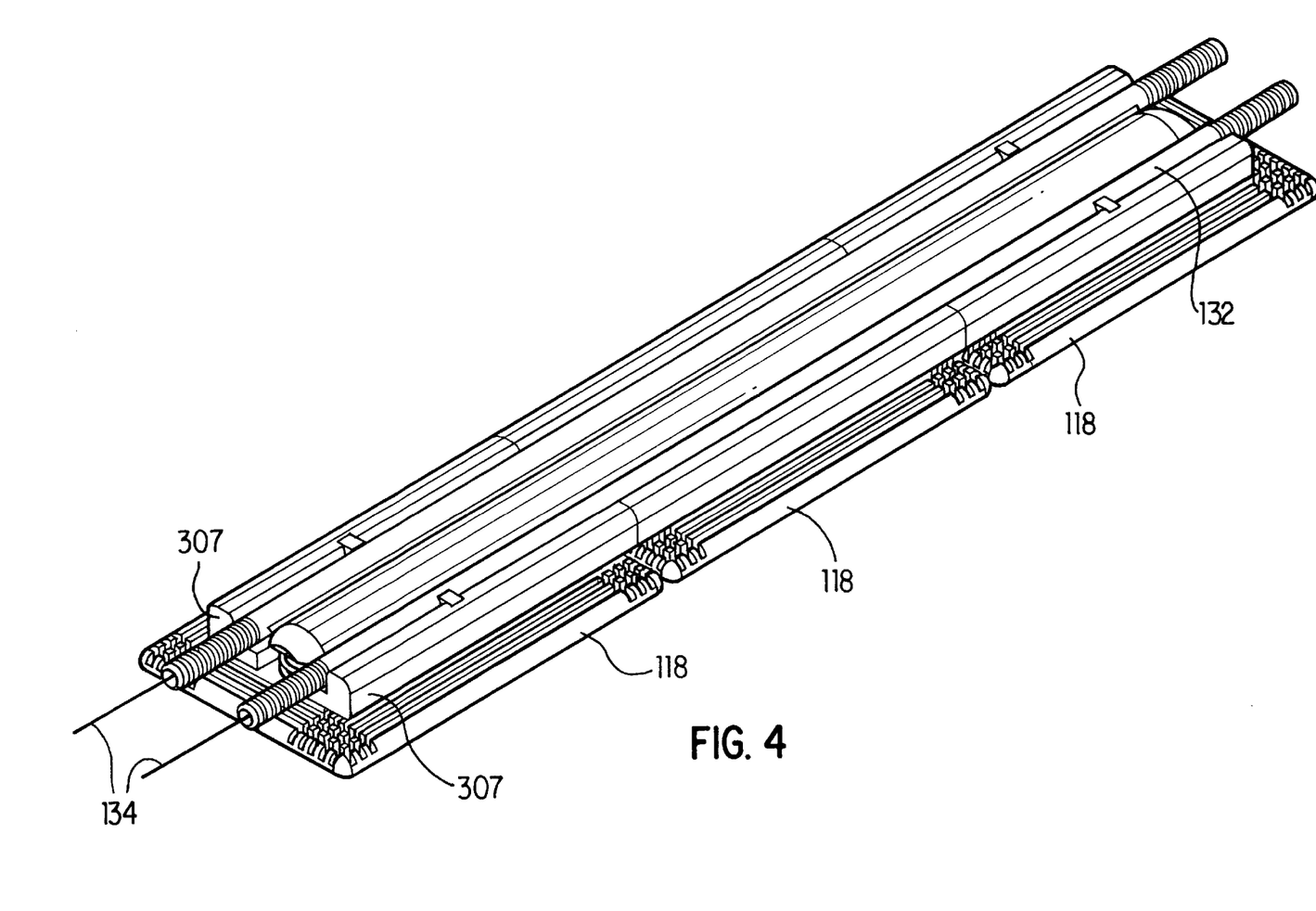
FIG. 4 is a perspective illustration of the cathode/pre-ionizer assembly according to the invention.

FIG. 4 is a perspective illustration of the cathode/pre-ionizer assembly. As previously described, on either side of cathode 108 is a pre-ionizer 130. Surrounding each pre-ionizer 130 is a ceramic insulator 307 designed to promote gas flow through discharge region 112.

Figure 5:
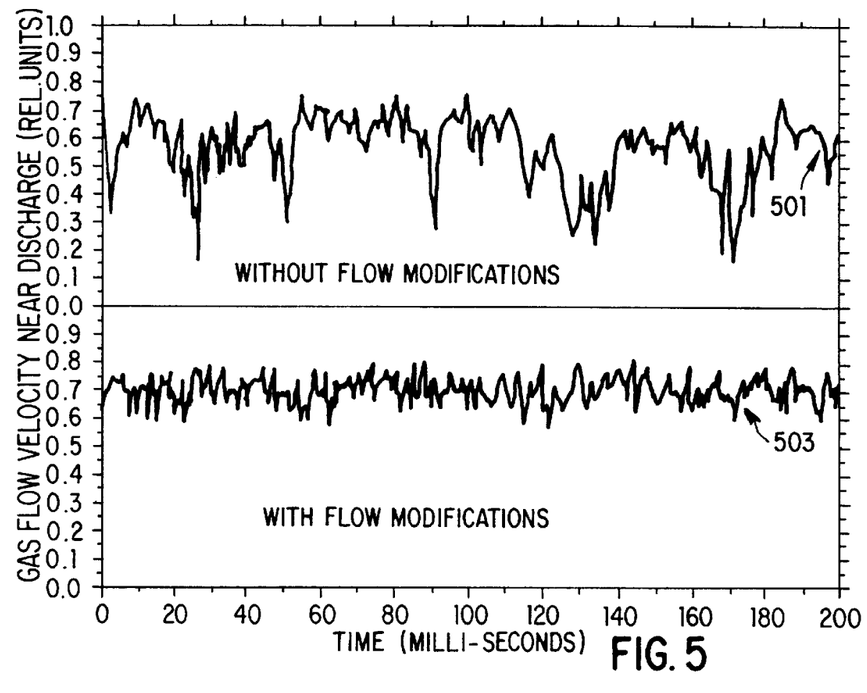
FIG. 5 is a graph of flow turbulence measured just downstream of the discharge region.

FIG. 5 is a graph of flow turbulence measured just downstream of discharge region 112. A hot-wire anemometer capable of resolving velocity changes on a time scale of the order of 200 microseconds was used for these measurements. Curve 501 illustrates the measured turbulence for the prior art system shown in FIG. 1. Curve 503 illustrates the measured turbulence for the preferred embodiment of the invention shown in FIG. 3. Based on peak to peak velocity excursions, the modifications to the chamber reduced the turbulence level by a factor of approximately 3. Furthermore, for the same blower speed the average flow velocity increased by approximately 17 percent with the modified chamber.

Figure 6:
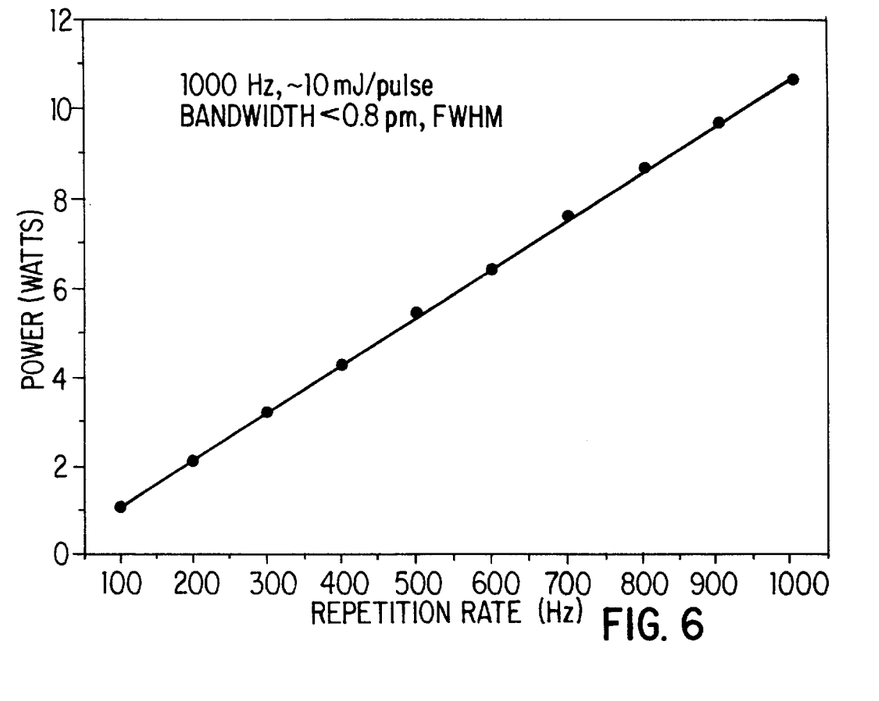
FIG. 6 is a graph showing output power versus repetition rate for an excimer laser fabricated according to the present invention.

FIG. 6 is a graph showing output power versus repetition rate for the excimer laser fabricated according to the present invention. As illustrated, the output power scales linearly with repetition rate, reaching approximately 11 watts at 1 kHz.

Figure 7A:
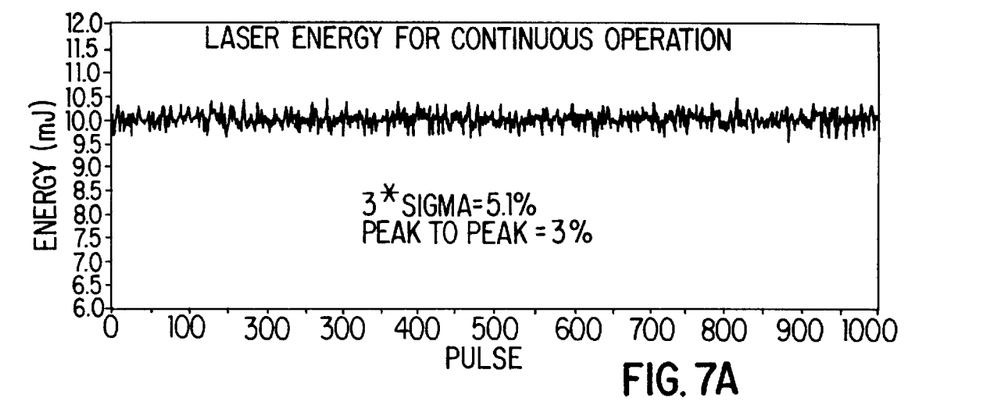
FIG. 7 provides pulse energy stability data for a modified excimer laser.
Figure 7B:
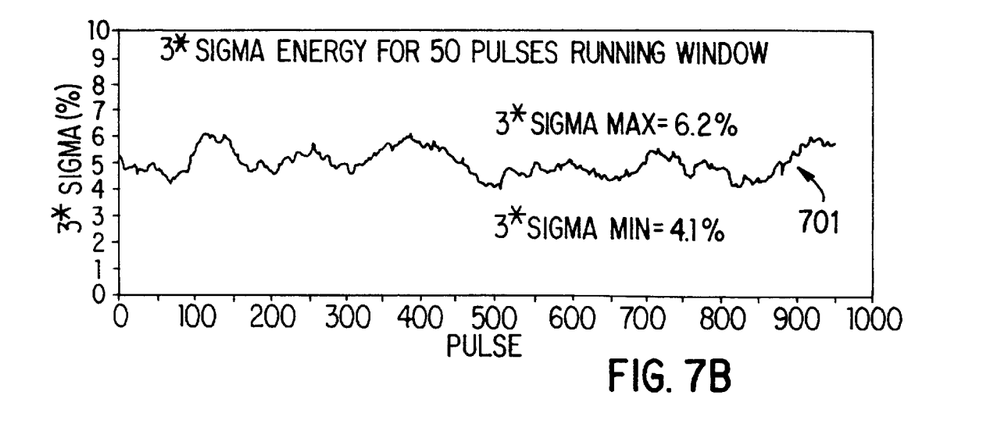
Figure 7C:
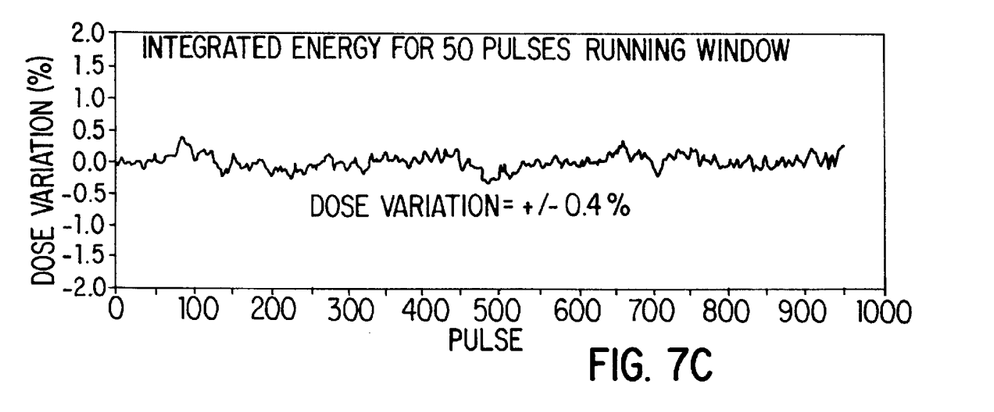

FIG. 7 provides pulse energy stability data for the modified excimer laser. Pulse energy stability is of particular importance for microlithographic applications. Graph 701 shows that the 3 sigma value of pulse energy fluctuation is less than or equal to 5 percent for a 50 pulse window.

Figure 8:
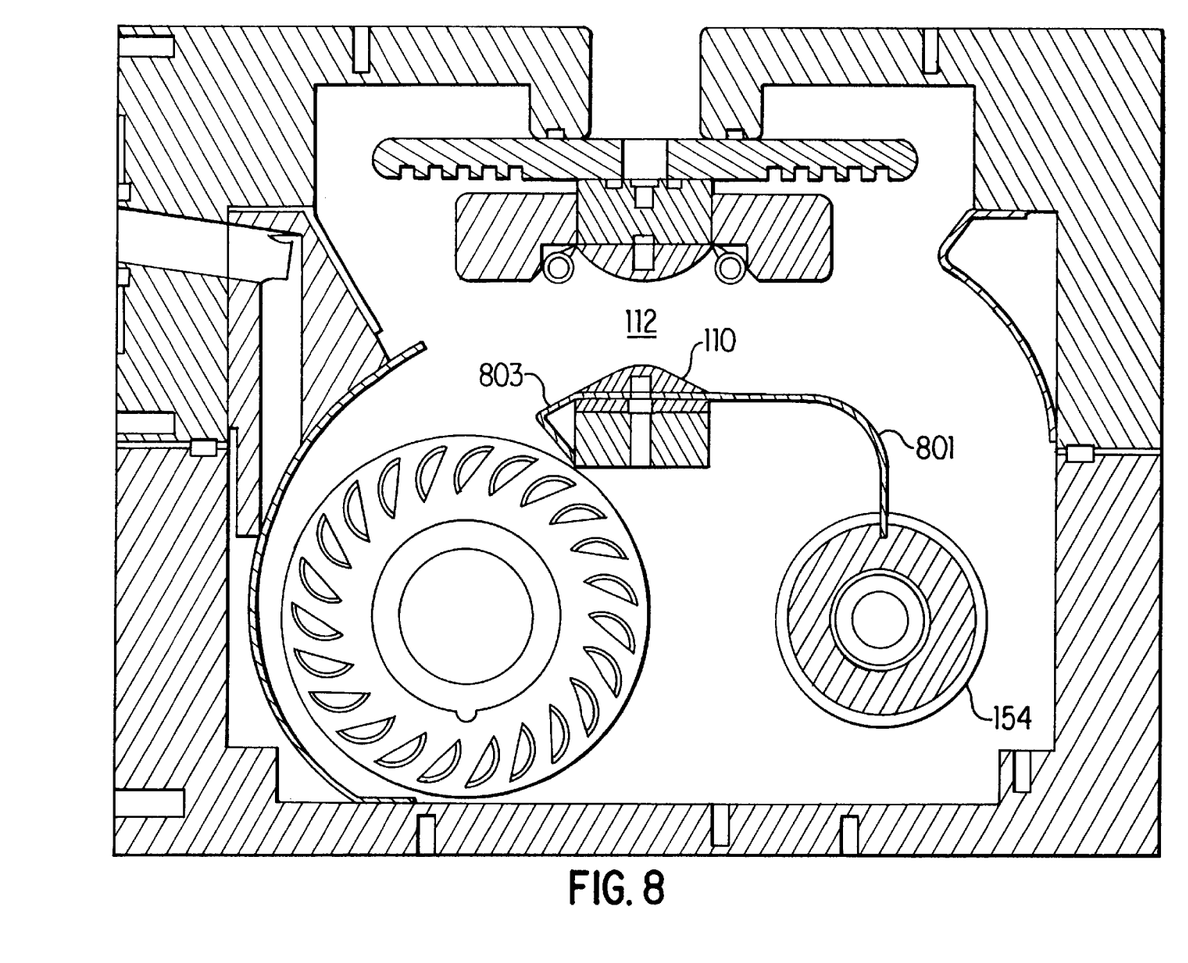
FIG. 8 is an illustration of an alternate embodiment of the invention.

FIG. 8 is an illustration of an alternate embodiment of the invention. In this embodiment exit vane 311 has been replaced with an exit vane 801. Although the purpose of vane 801 is the same, it extends further towards the chamber housing before extending downwardly towards heat exchanger 154. A vane 803 is added to the leading edge of the anode assembly, thus further reducing turbulence at this location and promoting flow through discharge region 112.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

We claim:

1. An excimer laser, comprising:
   a housing structure defining a laser cavity for containing a gas capable of lasing;
   a first electrode and a second electrode disposed in spaced relationship within the housing and defining a discharge region;
   a fan for circulating said gas through said laser cavity;
   a heat exchanger disposed within said housing for cooling said gas;
   a first insulating member disposed in proximity to said first electrode, wherein said gas passes said first insulating member prior to entering said discharge region, wherein said first insulating member reduces gas turbulence in said discharge region; and
   a second insulating member disposed in proximity to said first electrode, wherein said gas passes said second insulating member after passing through said discharge region, wherein said second insulating member reduces gas turbulence in said discharge region.

2. The excimer laser of claim 1, further comprising a pre-ionizer adjacent to said first electrode, wherein said first insulating member partially surrounds said pre-ionizer.

3. The excimer laser of claim 1, further comprising:
   a first pre-ionizer adjacent to said first electrode, wherein said first insulating member partially surrounds said first pre-ionizer; and
   a second pre-ionizer adjacent to said first electrode, wherein said second insulating member partially surrounds said second pre-ionizer.

4. The excimer laser of claim 1, further comprising an arcing vane partially surrounding said fan, said vane directing gas from said fan towards said discharge region.

5. The excimer laser of claim 4, further comprising a gas siphon, said gas siphon having an inlet passing through a portion of said vane, wherein a portion of said gas from said fan passes through said inlet.

6. The excimer laser of claim 1, further comprising a support member coupled to said second electrode, wherein said support member extends substantially between said second electrode and said fan, wherein said support member substantially prevents said gas circulated by said fan from bypassing said discharge region.

7. The excimer laser of claim 1, further comprising a first arcing vane coupled to said second electrode, wherein said first arcing vane directs said gas exiting said discharge region towards said heat exchanger.

8. The excimer laser of claim 7, further comprising a second arcing vane coupled to said housing, wherein said second arcing vane directs said gas exiting said discharge region towards said heat exchanger.

9. The excimer laser of claim 1, further comprising:
   a first arcing vane partially surrounding said fan, said first vane directing gas from said fan toward said discharge region;
   a support member coupled to said second electrode, wherein said support member extends between said second electrode and said fan, wherein said support member substantially prevents said gas circulated by said fan from bypassing said discharge region;
   a second arcing vane coupled to said second electrode and said support member; and
   a third arcing vane coupled to said housing, wherein said third arcing vane in conjunction with said second arcing vane directs said gas exiting said discharge region towards said heat exchanger.

10. An excimer laser, comprising:
    a housing structure defining a laser cavity for containing a gas capable of lasing;
    a cathode and an anode separated along a first direction, wherein said cathode and said anode define a discharge region;
    a main insulator isolating said cathode from said housing structure;
    a first pre-ionizer and a second pre-ionizer proximate said cathode and separated along a second direction transverse to said first direction;
    a first insulating member proximate said cathode and said first pre-ionizer, wherein said gas passes said first insulating member prior to entering said discharge region, wherein said first insulating member reduces gas turbulence in said discharge region;
    a second insulating member proximate said cathode and said second pre-ionizer, wherein said gas passes said second insulating member after passing through said discharge region, wherein said second insulating member reduces gas turbulence in said discharge region;
    a fan for circulating said gas through said laser cavity; and
    a heat exchanger disposed within said housing structure for cooling said gas.

11. The excimer laser of claim 9, further comprising:
    a first arcing vane partially surrounding said fan, said first vane directing gas from said fan toward said discharge region
    a second arcing vane coupled to said second electrode; and
    a third arcing vane coupled to said housing structure, wherein said second and third arcing vanes direct said gas exiting said discharge region towards said heat exchanger.

12. The excimer laser of claim 11, further comprising an anode support member, wherein said support member extends substantially between said anode and said fan, wherein said support member substantially prevents said gas circulated by said fan from bypassing said discharge region.

13. The excimer laser of claim 12, further comprising a fourth vane coupled to said support member, wherein said fourth vane decreases turbulence in said gas prior to said gas entering said discharge region.

14. The excimer laser of claim 10, wherein said first and second insulating members are fabricated from aluminum oxide.

* * * * *

UNITED STATES PATENT AND TRADEMARK OFFICE
CERTIFICATE OF CORRECTION

PATENT NO. : 5,771,258  
DATED : June 23, 1998  
INVENTOR(S) : Richard George Morton et al.

Page 1 of 1

It is certified that error appears in the above-identified patent and that said Letters Patent is hereby corrected as shown below:

<u>Column 8, claim 11,</u>  
Line 42, delete "9" and subtitute -- 10 -- therefor.

Signed and Sealed this

Ninth Day of April, 2002

Attest:

JAMES E. ROGAN  
*Director of the United States Patent and Trademark Office*

*Attesting Officer*